W. CONINE.
VARIABLE SPEED POWER TRANSMITTING MECHANISM.
APPLICATION FILED FEB. 2, 1910.
989,946.
Patented Apr. 18, 1911.
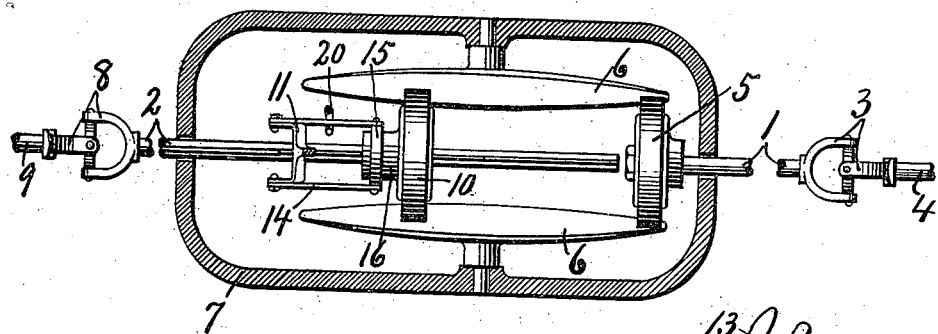
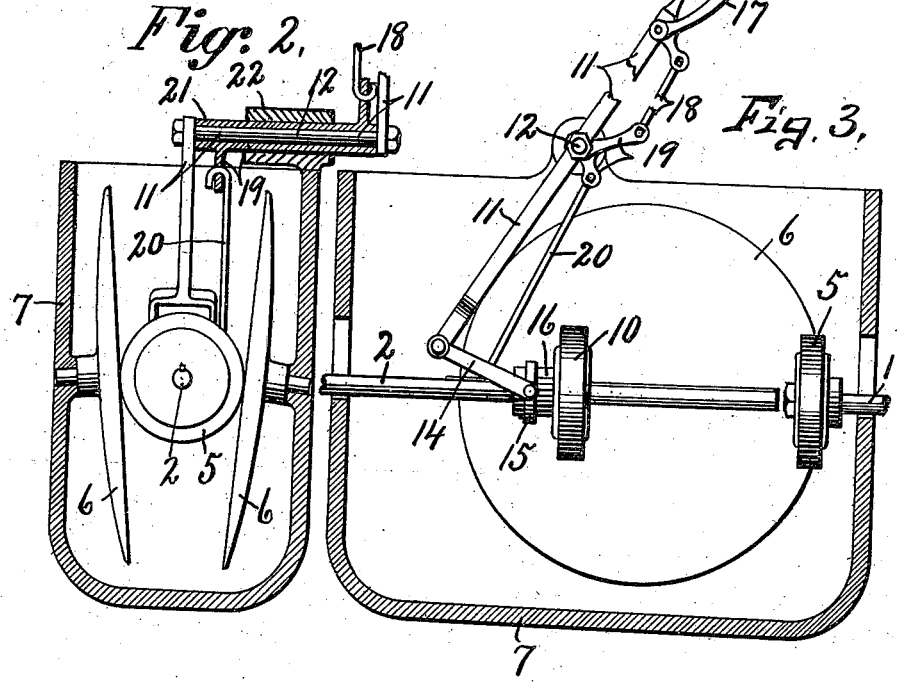

UNITED STATES PATENT OFFICE.

WILEY CONINE, OF ONEIDA, NEW YORK.

VARIABLE-SPEED POWER-TRANSMITTING MECHANISM.

989,946.  Specification of Letters Patent.  Patented Apr. 18, 1911.

Application filed February 2, 1910. Serial No. 541,589.

*To all whom it may concern:*

Be it known that I, WILEY CONINE, of Oneida, in the county of Madison, in the State of New York, have invented new and useful Improvements in Variable - Speed Power-Transmitting Mechanism, of which the following, taken in connection with the accompanying drawings, is a full, clear, and exact description.

This invention relates to certain improvements in variable speed power transmitting mechanism of the friction disk type and while it is particularly applicable for transmitting motion from the engine shaft to the running gear of automobiles and similar vehicles, it is equally useful in other relations for transmitting rotary motion from any driving shaft to another driven shaft.

The main object is to establish a wedging contact of the driving and driven disks with two opposed transmission disks and at the same time to permit one of the first named disks to be moved axially across the faces of said transmission disks for varying the speed or reversing the direction of rotation of the driven disk.

Another object is to provide for the radial adjustment of one of the first named disks into and out of wedging contact the transmission disks for stopping or starting the driven mechanism irrespective of the driven element.

Other objects and uses will be brought out in the following description.

In the drawings: Figure 1 is a top plan of a friction transmission gearing embodying the various features of my invention, the gear case being shown in section. Fig. 2 is an end view of the same mechanism. Fig. 3 is a side elevation of a portion of the driving and driven shafts, showing the disks thereon and also showing one of the transmission gears.

In illustrating the operation of my invention, I have shown a driving shaft —1— and driven shaft —2—, the driving shaft —1— being connected by universal joint —3— to a motor shaft —4— of an automobile or other machine.

The driving shaft —1— is provided with a friction disk —5— having its diametrically opposite sides bearing against the inner faces of a pair of opposed transmission disks —6—. These transmission disks are journaled in suitable bearings in a gear case —7— with their axes disposed in the same vertical plane, but inclined downwardly and outwardly thereby disposing the inner faces of the disk in downwardly converging planes with their horizontal diameters in substantially the same horizontal plane as the axes of the driving and driven shafts —1— and —2—. The driven shaft —2— is also connected by universal joint —8— and shaft section —9— to the rear axial or running gear of the vehicle or other machine which it is desired to operate but not necessary to herein illustrate or describe.

A friction disk —10— is feathered upon the driven shaft —2— to rotate therewith and to move axially thereon, said driven disk —10— being of substantially the same diameter as the disk —5— and contacts with the inner faces of the transmission disks —6— which impart rotary motion thereto.

The driving shaft —1— and driven shaft —2— are both movable vertically for the purpose of wedging their respective disks —5— and —10— into contact with the transmission disks —6— or elevating them out of such contact when it may be desired.

In practice both disks are held in such contact by gravity, so as to automatically take up wear and insure a more positive transmission of power from the driving shaft to the driven shaft.

As previously stated, the disk —10— may be moved axially across the face of the transmission disks —6— for varying the speed or reversing the direction of rotation of the driven shaft —2— and for this purpose I provide a shifting lever —11— which is fulcrumed at —12— on a portion of the frame of the machine, not shown, and is provided with a handle —13— within convenient reaching distance from the position of the operator, said lever being connected by links —14— to a collar —15— on the grooved hub —16— of the disk —10—.

In order that the driven shaft —2— and its friction disk —10— may remain at rest while the driving shaft —1— is rotated, the disk —10— may be moved to the center of the transmission disk —6— or may be elevated out of contact with said disks by means of a hand lever —17— and suitable connections as link —18—, bell crank lever —19— and link —20—, the hand lever —17— being pivoted to the upper end of the hand lever —11—.

The bell crank lever —19— preferably constitutes a part of a sleeve —21— which is mounted on the fulcrum rod —12— of the lever —11—, so as to be moved independently thereof.

It is now clear that as the lever —17— is pressed toward the handle —13— of the lever —11— by hand, its connection with the link —14— will cause the disk —10— and shaft —2— to be raised or tilted upwardly out of contact with the transmission disks —6— thereby stopping the rotation of the driven disk —10—, shaft —2— and parts connected thereto.

The main feature of the invention lies in disposing the transmission disks —6— in downwardly converging planes in combination with driving and driven disks, as —5— and —10—, in wedging contact with the meeting faces of the transmission disks either by gravity or under pressure, at least one of the intermediate disks being movable vertically into and out of contact with the friction faces of the transmission disks and any suitable means for moving one of said intermediate disks axially across the face of the transmission disks.

The sleeve —21— in which the shaft —12— is journaled may be journaled in any suitable bearings, as —22—, on the gear case —7—, so as to be operated independently of the shaft —12— for rocking the driven shaft —2— vertically to move the disk —10— into and out of contact with the transmission disks —6—.

It is evident that any suitable mechanism other than those shown in the drawings may be employed for shifting the disk —10— both vertically and axially without departing from the spirit of my invention.

What I claim is:

1. In a power transmitting mechanism, a pair of friction disks disposed at an angle to each other, a driving wheel between and frictionally engaging the disks, a driven wheel also between and frictionally engaging said disks, both of said friction wheels being movable transversely of their axes into and out of contact with the friction disks.

2. In a power transmitting mechanism, opposite friction disks disposed in planes converging in one direction, a driving shaft composed of sections connected by a universal joint, one of the sections being movable toward and from the apex of such angle and a friction wheel thereon engaging the disks, a separate friction wheel also engaging the said disks, and means for moving the last named wheel axially.

3. A power transmitting mechanism comprising opposite friction disks disposed in planes converging in one direction, a driving shaft, a friction wheel thereon engaging said disks, a driven shaft composed of sections connected by a universal joint, one of the sections being tiltable transversely of its axis, a separate friction wheel mounted upon and movable lengthwise of the tiltable shaft section for engagement with the disks, means for moving said friction wheel axially, and separate means for tilting the movable shaft section.

In witness whereof I have hereunto set my hand on this 22nd day of January 1910.

WILEY CONINE.

Witnesses:
H. E. CHASE,
A. L. HUMPHREY.

---

Copies of this patent may be obtained for five cents each, by addressing the "Commissioner of Patents, Washington, D. C."